(12) United States Patent
Nakao et al.

(10) Patent No.: US 8,929,307 B2
(45) Date of Patent: Jan. 6, 2015

(54) WIRELESS BASE STATION, WIRELESS TERMINAL, AND CHANNEL SIGNAL FORMATION METHOD

(75) Inventors: Seigo Nakao, Kanagawa (JP); Akihiko Nishio, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 389 days.

(21) Appl. No.: 13/131,480

(22) PCT Filed: Dec. 25, 2009

(86) PCT No.: PCT/JP2009/007254
§ 371 (c)(1),
(2), (4) Date: May 26, 2011

(87) PCT Pub. No.: WO2010/073702
PCT Pub. Date: Jul. 1, 2010

(65) Prior Publication Data
US 2011/0222503 A1 Sep. 15, 2011

(30) Foreign Application Priority Data
Dec. 26, 2008 (JP) ................................. 2008-332127

(51) Int. Cl.
*H04W 72/00* (2009.01)
*H04W 28/06* (2009.01)
*H04L 5/00* (2006.01)
*H04W 28/04* (2009.01)
*H04W 72/04* (2009.01)
*H04W 88/08* (2009.01)

(52) U.S. Cl.
CPC ............. *H04W 28/06* (2013.01); *H04L 5/0023* (2013.01); *H04L 5/0053* (2013.01); *H04L 5/006* (2013.01); *H04W 28/04* (2013.01); *H04W 72/04* (2013.01); *H04W 88/08* (2013.01)
USPC ............................................ 370/329; 370/335

(58) Field of Classification Search
USPC .................................................. 370/329, 335
See application file for complete search history.

(56) References Cited

U.S. PATENT DOCUMENTS

2010/0215004 A1* 8/2010 Yoo ............................... 370/329
2010/0290419 A1* 11/2010 Wengerter .................... 370/329

OTHER PUBLICATIONS

International Search Report dated Mar. 23, 2010.

(Continued)

*Primary Examiner* — Donald Mills
*Assistant Examiner* — Henry Baron
(74) *Attorney, Agent, or Firm* — Dickinson Wright PLLC

(57) ABSTRACT

Disclosed are a wireless base station, wireless terminal, and channel signal formation method that can prevent the quality of downstream assignment control data from degrading, while preventing the number of blind determinations from increasing on the wireless terminal on the receiving side of the downstream control channel signal. In a base station (100), a control unit (101) and a data size regulation unit (103) control the data size of downstream assignment control data and upstream assignment control data contained in the PDCCH signal based on the communication format used between the base station (100) and a terminal (200), the number of antennas (M) (nonnegative number) on the base station (100), the number of antennas (N) (nonnegative number) on the terminal (200), the bandwidth of the downstream band, and the bandwidth of the upstream band. Specifically, the control unit (101) determines it is unnecessary to adjust the aforementioned data size when the selected communication format is first established between multiple antennas and when where there are multiple for one of M and N and only one for the other.

14 Claims, 6 Drawing Sheets

(56) References Cited

OTHER PUBLICATIONS

3GPP TSG RAN WG1 52bis, "PDCCH Content and Formats," Texas Instruments, R1-081367, Mar. 31-Apr. 4, 2008, pp. 1-6.
3GPP TSG RAN WG1 #52, "Indication of UE Antenna Selection for PUSCH," Motorola, R1-080721, Feb. 11-15, 2008, pp. 1-2.
3GPP TS 36.211 V8.4.0, "3rd Generation Partnership Project; Technical Specification Group Radio Access Network; Evolved Universal Terrestrial Radio Access (E-UTRA); Physical Channels and Modulation (Release 8)," Sep. 2008, pp. 1-78.
3GPP TS 36.212 V8.4.0, "3rd Generation Partnership Project; Technical Specification Group Radio Access Network; Evolved Universal Terrestrial Radio Access (E-UTRA); Multiplexing and channel coding (Release 8)," Sep. 2008, pp. 1-56.
3GPP TS 36.213 V8.4.0, "3rd Generation Partnership Project; Technical Specification Group Radio Access Network; Evolved Universal Terrestrial Radio Access (E-UTRA); Physical layer procedures (Release 8)," Sep. 2008, pp. 1-60.
3GPP TSG RAN WG1 #54bis, "Uplink multiple access schemes for LTE-A," LG Electronics, R1-083658, Sep. 29-Oct. 3, 2008, pp. 1-12.
3GPP TSG RAN WG1 54bis, "Further Analysis on Uplink SU-MIMO for E-UTRA," Texas Instruments, R1-083529, Sep. 29-Oct. 3, 2008, pp. 1-8.

\* cited by examiner

| NUMBER OF ANTENNAS | MULTIPLE FORMAT PAIRS FOR WHICH TERMINAL PERFORMS BLIND DECODING (EXAMPLE) | PAYLOAD SIZE FOR RECEIVING FORMAT PAIR |
|---|---|---|
| BASE STATION: 2Tx TERMINAL: 2Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM LARGER ONE OF SIZE OF FORMAT 0A DETERMINED FROM UPLINK BAND AND SIZE OF FORMAT 0A DETERMINED FROM UPLINK BAND AND NUMBER OF TRANSMITTING ANTENNAS OF TERMINAL, AND SIZE OF FORMAT 1B DETERMINED FROM DOWNLINK BAND AND NUMBER OF TRANSMITTING ANTENNAS OF BASE STATION (SIZE IS ADJUSTED BY PADDING). |
| BASE STATION: 2Tx TERMINAL: 1Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM SIZE OF FORMAT 1B DETERMINED FROM DOWNLINK BAND AND NUMBER OF TRANSMITTING ANTENNAS OF BASE STATION (NO PADDING). FORMAT 0A IS NO TRANSMITTED SUBSTANTIALLY. |
| BASE STATION: 1Tx TERMINAL: 2Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM SIZE OF FORMAT 0A DETERMINED FROM UPLINK BAND AND NUMBER OF TRANSMITTING ANTENNAS OF TERMINAL (NO PADDING). FORMAL 1B IS NO TRANSMITTED SUBSTANTIALLY. |

FIG.5

| MODE NUMBER REPORTED FROM BASE STATION | MULTIPLE FORMAT PAIRS WHICH TERMINAL PERFORMS BLIND DECODING (EXAMPLE) | PAYLOAD SIZE TO RECEIVE FORMAT PAIR |
|---|---|---|
| BASE STATION: 2Tx TERMINAL: 2Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM LARGER ONE OF SIZE OF FORMAT 0A DETERMINED FROM UPLINK BAND AND NUMBER OF TRANSMITTING ANTENNAS OF TERMINAL, AND SIZE OF FORMAT 1B DETERMINED FROM DOWNLINK BAND AND NUMBER OF TRANSMITTING ANTENNAS OF BASE STATION (SIZE IS ADJUSTED BY PADDING). |
| BASE STATION: 2Tx TERMINAL: 1Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM SIZE OF FORMAT 1B DETERMINED FROM DOWNLINK BAND AND NUMBER OF TRANSMITTING ANTENNAS OF BASE STATION (NO PADDING). FORMAT 0A IS NO TRANSMITTED SUBSTANTIALLY. |
| BASE STATION: 1Tx TERMINAL: 2Tx | Format 0/1A | PAYLOAD SIZE IS DETERMINED FROM LARGER ONE OF SIZE OF FORMAT 0 DETERMINED FROM UPLINK BAND AND SIZE OF FORMAT 1A DETERMINED FROM DOWNLINK BAND (SIZE IS ADJUSTED BY PADDING). |
| | Format 0A/1B | PAYLOAD SIZE IS DETERMINED FROM SIZE OF FORMAT 0A DETERMINED FROM UPLINK BAND AND NUMBER OF TRANSMITTING ANTENNAS OF TERMINAL (NO PADDING). FORMAT 1B IS NO TRANSMITTED SUBSTANTIALLY. |

FIG.6

WIRELESS BASE STATION, WIRELESS TERMINAL, AND CHANNEL SIGNAL FORMATION METHOD

TECHNICAL FIELD

The present invention relates to a radio base station, radio terminal, and channel signal forming method.

BACKGROUND ART

In 3GPP LTE, OFDMA (Orthogonal Frequency Division Multiple Access) is employed as a downlink communication method. In a radio communication system adopting 3GPP LTE, a base station transmits a synchronizing signal (synchronization channel: SCH) and a broadcast signal (broadcast channel: BCH) using prescribed communication resources. A terminal first synchronizes with a base station by capturing the SCH. Then, the terminal acquires parameters that are specific to that base station (for example, a frequency bandwidth) by reading BCH information (see Non-patent Literature 1, 2 and 3).

Also, after the terminal acquires base station-specific parameters, the terminal sends a connection request to the base station, and, by this means, establishes communication with the base station. When necessary, the base station transmits control information to the terminal, with which communication has been established, using a PDCCH (Physical Downlink Control CHannel).

The terminal performs "blind detection" for a received PDCCH signal. That is, a PDCCH signal includes a CRC (Cyclic Redundancy Check) part, and, at a base station, this CRC part is masked by the terminal ID of the target terminal. Thus, until a terminal demasks the CRC part of a received PDCCH signal with the terminal's terminal ID, the terminal cannot decide whether or not the PDCCH signal is for that terminal. In this blind detection, if the result of demasking is that CRC calculation is OK, the PDCCH signal is decided to have been sent for the terminal.

Also, control information sent from a base station includes assignment control information including information about resources which a base station allocates to a terminal. A terminal needs to receive both downlink assignment control information and uplink assignment control information which have a plurality of formats. Although downlink assignment control information which a terminal should receive can be defined in a plurality of sizes depending on the transmitting antenna control method and frequency allocation method at a base station, and a terminal identifies the format using this size difference, some of these downlink assignment control information formats (hereinafter simply referred to as "downlink assignment control information") and uplink assignment control information formats (hereinafter simply referred to as "uplink assignment control information") are transmitted in a PDCCH signal which has the same size. Downlink assignment control information and uplink assignment control information which have this same information size include type information of assignment control information (for example, a 1-bit flag). Thus, even if the size of a PDCCH signal including downlink assignment control information and the size of a PDCCH signal including uplink assignment control information are the same, a terminal checks type information of assignment control information, and, by this means can distinguish between downlink assignment control information and uplink assignment control information. The PDCCH format to transmit uplink assignment control information is PDCCH format 0, and the PDCCH format to transmit downlink assignment control information, transmitted in a PDCCH signal being the same size as uplink assignment control information, is PDCCH format 1A.

However, cases might occur where the information size of uplink assignment control information determined from the uplink bandwidth (that is, the number of bits required for transmission) and the information size of downlink assignment control information determined from the downlink bandwidth differ. To be more specific, if an uplink bandwidth is small, the information size of uplink assignment control information becomes small, and, if a downlink bandwidth is small, the information size of downlink assignment control information becomes small. If a difference of bandwidth results in a difference of information size like this, by adding zero information to the smaller assignment control information (that is, by performing zero-padding), the size of downlink assignment control information and the size of uplink assignment control information are made equal. By this means, whether the content is downlink assignment control information or uplink assignment control information, PDCCH signals have the same size. The size adjustment of control information as mentioned above reduces the number of times of blind detection at a terminal on the receiving side.

Also, the standardization of 3GPP LTE-advanced has been started to realize much faster communication than 3GPP LTE. 3GPP LTE-advanced system (hereinafter referred to as "LTE-A system") follows 3GPP LTE system (hereinafter referred to as "LTE system"). In 3GPP LTE-advanced, to realize an uplink transmission speed of maximum 500 Mbps or greater and improve uplink frequency use efficiency, MIMO (Multi-Input Multi-Output) in uplink communication is expected to be introduced. Thus, a terminal has multiple transmitting antennas, and controls an uplink transmission weight (that is, precoding vector) and the number of uplink channel data subject to spatial multiplex (that is, the number of spatial layers) based on the command of a base station.

Also, to improve uplink frequency use efficiency, studies are underway to allocate uplink data in the frequency domain discontinuously (hereinafter simply referred to as "discontinuous allocation"). In this case, for example, OFDM and clustered DFT-s-OFDMA are applied (see Non-patent Literature 4). Thus, while conventional LTE only supports a continuous allocation in a frequency domain because of a limitation of SC-TDMA, it is possible in an LTE-A system to allocate a high quality subcarrier adaptively to a terminal in the frequency domain, so that uplink frequency use efficiency is expected to be improved.

CITATION LIST

Non-Patent Literature

NPL 1
3GPP TS 36.211 V8.4.0, "Physical Channels and Modulation (Release 8)," September 2008
NPL 2
3GPP TS 36.212 V8.4.0, "Multiplexing and channel coding (Release 8)," September 2008
NPL 3
3GPP TS 36.213 V8.4.0, "Physical layer procedures (Release 8)," September 2008
NPL 4
3GPP TSG RAN WG1 #54bis document R1-083658 "Uplink multiple access schemes for LTE-A" LGE, September 2008

SUMMARY OF INVENTION

Technical Problem

If a downlink frequency bandwidth and an uplink frequency bandwidth are almost equal, as for the above mentioned format pair, the information size of uplink assignment control information and downlink assignment control information is nearly the same. Thus, zero-padding is rarely performed. By contrast with this, if a downlink bandwidth is much larger than an uplink bandwidth, as for this pair, a lot of zero information is added to the smaller uplink assignment control information until the information size of this uplink assignment control information becomes equal to the information size of downlink assignment control information. Also, if an uplink bandwidth is much larger than a downlink bandwidth, as for this pair, a lot of zero information is added to the smaller downlink assignment control information until the information size of this downlink assignment control information becomes equal to the information size of uplink assignment control information. However, zero-padding is performed for size adjustment, and zero information itself carries no meaning. As a result, assignment control information includes fundamentally unnecessary signal, so that if overall power is fixed, power per information bit fundamentally necessary declines.

Also, to avoid zero-padding, it is possible to apply a method of making the information sizes of uplink assignment control information and downlink assignment control information of the format pair different. However, in this case, a terminal side has to perform blind detection separately for two pieces of assignment control information having different numbers of information bits. Thus, in a terminal, the number of times of blind detection increases, and, accompanying this, the increase of circuit scale becomes a problem.

Also, if MIMO and discontinuous allocation are applied to uplink, it is necessary to indicate by a downlink control signal which transmission weight, (that is, precoding vector), a base station uses to transmit uplink channel data for a terminal, MCS for each layer on a spatial axis, and a command of discontinuous frequency allocation. Thus, while in an uplink of conventional LTE, there is no idea of MIMO and discontinuous allocation, so that only Format 0 is used to report resource allocation for uplink channel data, in an uplink of an LTE-A system, in accordance with the introduction of a spatial multiplexing, a directional transmission of MIMO, and discontinuous allocation, multiple formats for reporting uplink channel data resource other than Format 0 are necessary. This shows that the number of formats in a downlink control signal which should be performed blind detection on a terminal side increases, and a terminal will become complicated, so that some kind of technique is required.

It is therefore an object of the present invention to provide a radio base station, radio terminal, and channel signal forming method that, when communication is performed using a downlink band and an uplink band between a radio terminal that has N transmission antenna ports (N is a natural number) and a radio base station that has M antenna ports (M is a natural number), prevent the number of times of blind detection in a radio terminal, which is on the receiving side of a downlink control channel signal from increasing, and reduce the frequency of performing size adjustment process to downlink assignment control information or uplink assignment control information, so that it is possible to prevent the quality of downlink assignment control information or uplink assignment control information from degrading.

Solution of Problem

A radio base station according to the present invention has M transmission antenna ports (M is a natural number), communicates with a radio terminal having N transmission antenna ports (N is a natural number) using a downlink band and an uplink band, and employs a configuration having: a forming section that forms a downlink channel signal including downlink assignment control information in a downlink band and uplink assignment control information in an uplink band; and a size control section that adjusts an information size of the downlink assignment control information and uplink assignment control information included in the formed downlink channel signal, based on a communication scheme applied between the radio base station and the radio terminal, a number M of transmitting antenna ports of the radio base station, a number N of transmitting antenna ports of the radio terminal, a bandwidth of the downlink band, and a bandwidth of the uplink band.

A radio terminal according to the present invention has N transmission antenna ports (N is a natural number), communicates with a radio base station having M transmission antenna ports (M is a natural number) using a downlink band and an uplink band, and employs a configuration to have: a radio reception section that receives a downlink channel signal including downlink assignment control information in a downlink band and uplink assignment control information in an uplink band; a determining section that determines the basic information size used for a receiving process of the downlink channel signal; and a channel signal receiving process section that receives a channel signal based on the basic information size, and, in this radio terminal, the determining section determines that the basic information size based on a communication scheme applied between the radio terminal and the radio base station, a number M of transmitting antenna ports of the radio base station, a number N of transmitting antenna ports of the radio terminal, a bandwidth of the downlink band, and a bandwidth of the uplink band.

A channel signal forming method according to the present invention forms a downlink channel signal used to control communication carried out between a radio terminal that has N transmission antenna ports (N is a natural number) and a radio base station that has M antenna ports (M is a natural number) using a downlink band and an uplink band, and the channel signal forming method, and includes forming a downlink channel signal including downlink assignment control information in a downlink band and uplink assignment control information in an uplink band; and adjusting an information size of the downlink assignment control information included in a downlink channel signal and uplink assignment control information included in the formed downlink channel signal based on a communication scheme applied between the radio base station and the radio terminal, a number M of transmitting antenna ports of the radio base station, a number N of transmitting antenna ports of the radio terminal, a bandwidth of the downlink band, and a bandwidth of the uplink band.

Advantageous Effects of Invention

The present invention provides a radio base station, radio terminal, and channel signal forming method that, when communication is performed using a downlink band and an uplink band between a radio terminal that has N transmission antenna ports (N is a natural number) and a radio base station that has M antenna ports (M is a natural number), prevent the number of times of blind detection in a radio terminal, which is on the receiving side of a downlink control channel signal from increasing, and reduce the frequency of performing size adjustment process to downlink assignment control information or uplink assignment control information, so that it is possible to prevent the quality of downlink assignment control information or uplink assignment control information from degrading.

BRIEF DESCRIPTION OF THE DRAWINGS

FIG. 5 shows operations of a base station and a terminal; and

FIG. 6 shows operations of a base station and a terminal.

DESCRIPTION OF EMBODIMENTS

Figure 1:
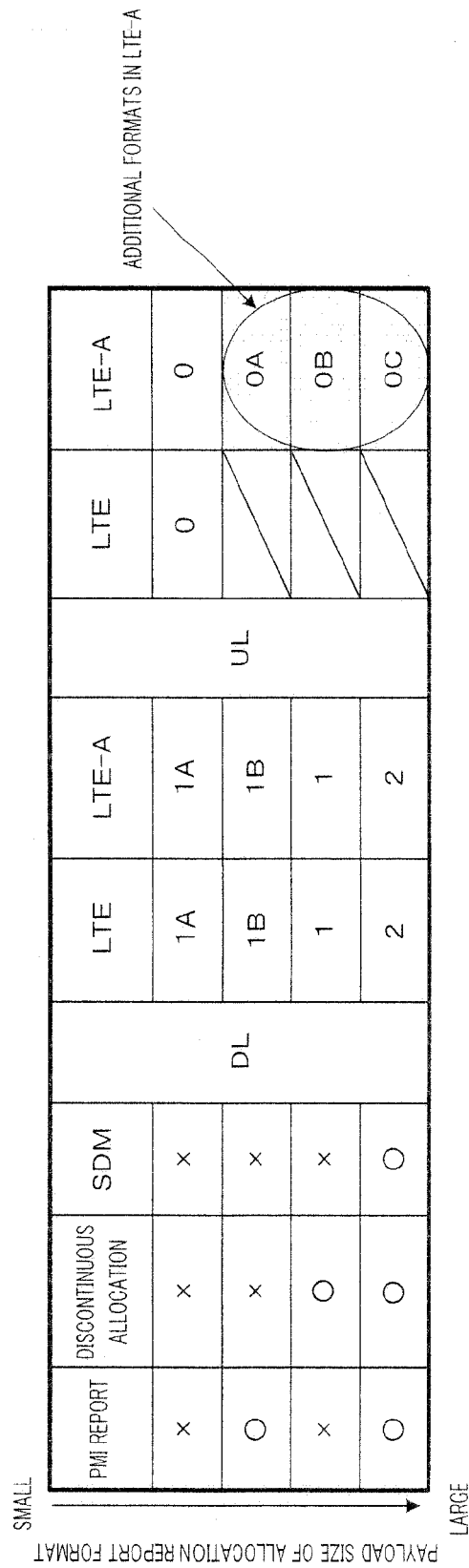
FIG. 1 shows a format for reporting uplink and downlink channel data resources.

As mentioned above, in an uplink of LTE-A system, in accordance with the introduction of spatial multiplexing, directional transmission of MIMO communication (hereinafter simply referred to as "directional transmission"), and discontinuous allocation, for example, as shown in FIG. 1, multiple formats (Format 0A/0B/0C) for reporting uplink channel data resources, other than Format 0, are necessary.

Here, the present inventors have taken note of the fact that in a downlink channel of LTE, spatial division multiplexing (SDM), directivity control (a precoding matrix indicator report (PMI report), and frequency discontinuous allocation already exist. That is to say, it is likely that, following an LTE system, a downlink channel of an LTE-A system uses the same formats (Format 1B/1/2) for reporting downlink channel data resource as in an LTE system. Also, the present inventors have taken note of the fact that the information sizes of Format 0A/0B/0C are the same as the information sizes of Format 1B/1/2 where the communication mode is applied.

Figure 2:
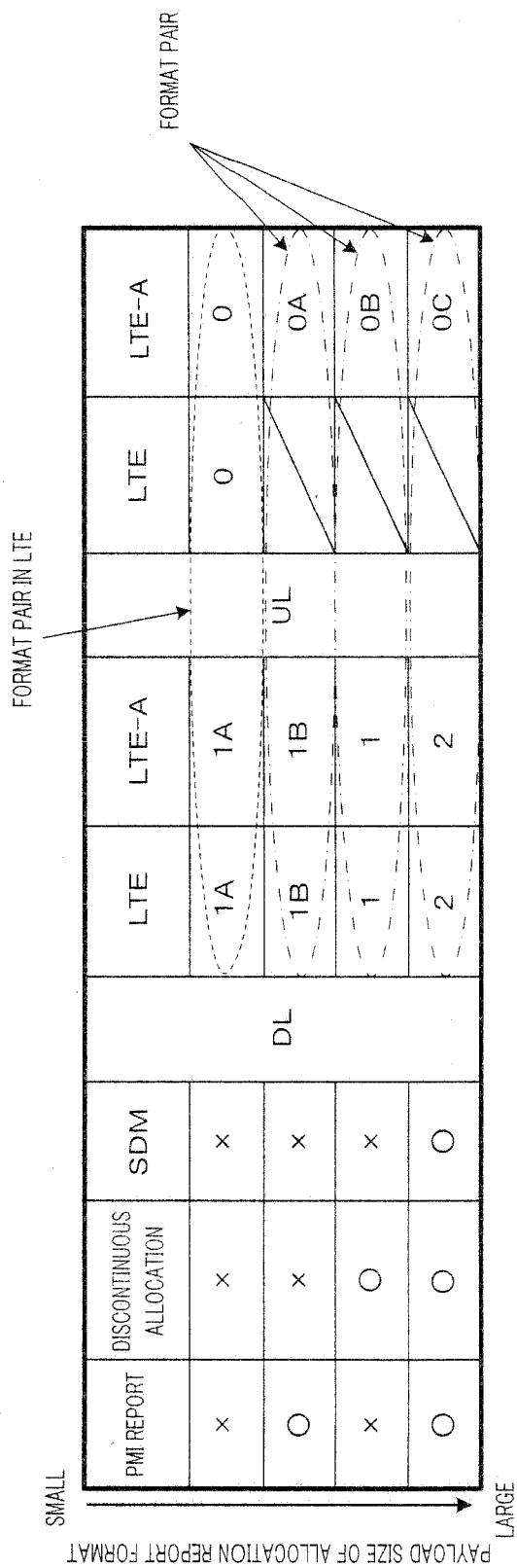
FIG. 2 shows a format for reporting resource.

Thus, the present inventors have found out that if the similar size formats are made as a set (see FIG. 2) like the relationship between Format 0 and Format 1A in LTE, and information size adjustment such as padding is performed to the set, a single blind detection on the receiving side can decode two formats at the same time.

Also, the present inventors have found out that part of these sets do not require information size adjustment. Furthermore, the present inventors have found out that the part of sets and other sets can be distinguished based on the number of transmitting antenna ports in a base station and the number of transmitting antenna ports in a terminal.

The present inventors have found out that by adjusting the information size of downlink assignment control information, included in a downlink channel signal, and uplink assignment control information, based on the number M of transmitting antenna port of a base station, the number N of transmitting antenna port of a terminal, a downlink bandwidth, and an uplink bandwidth, it is possible to prevent the number of times of blind detection in a radio terminal from increasing, and to prevent the quality of downlink assignment control information from degrading.

Here, "antenna port" means a logical antenna (antenna group) formed by one or multiple physical antennas. Thus, an antenna port is not limited to mean one physical antenna, and may be such as an array antenna formed by multiple antennas. For example, in non-patent literature 1, although how many physical antennas constitute an antenna port is not defined, an antenna port is defined as a minimum unit whereby a base station can transmit a different reference signal. An antennal port is also defined as a minimum unit of precoding vector weighting multiplication.

In the following embodiments, for ease of explanation, a case will be described where an "antenna port" and a physical antenna are associated on a one-by-one basis.

Now, an embodiment of the present invention will be explained in detail with reference to the accompanying drawings.

Figure 3:
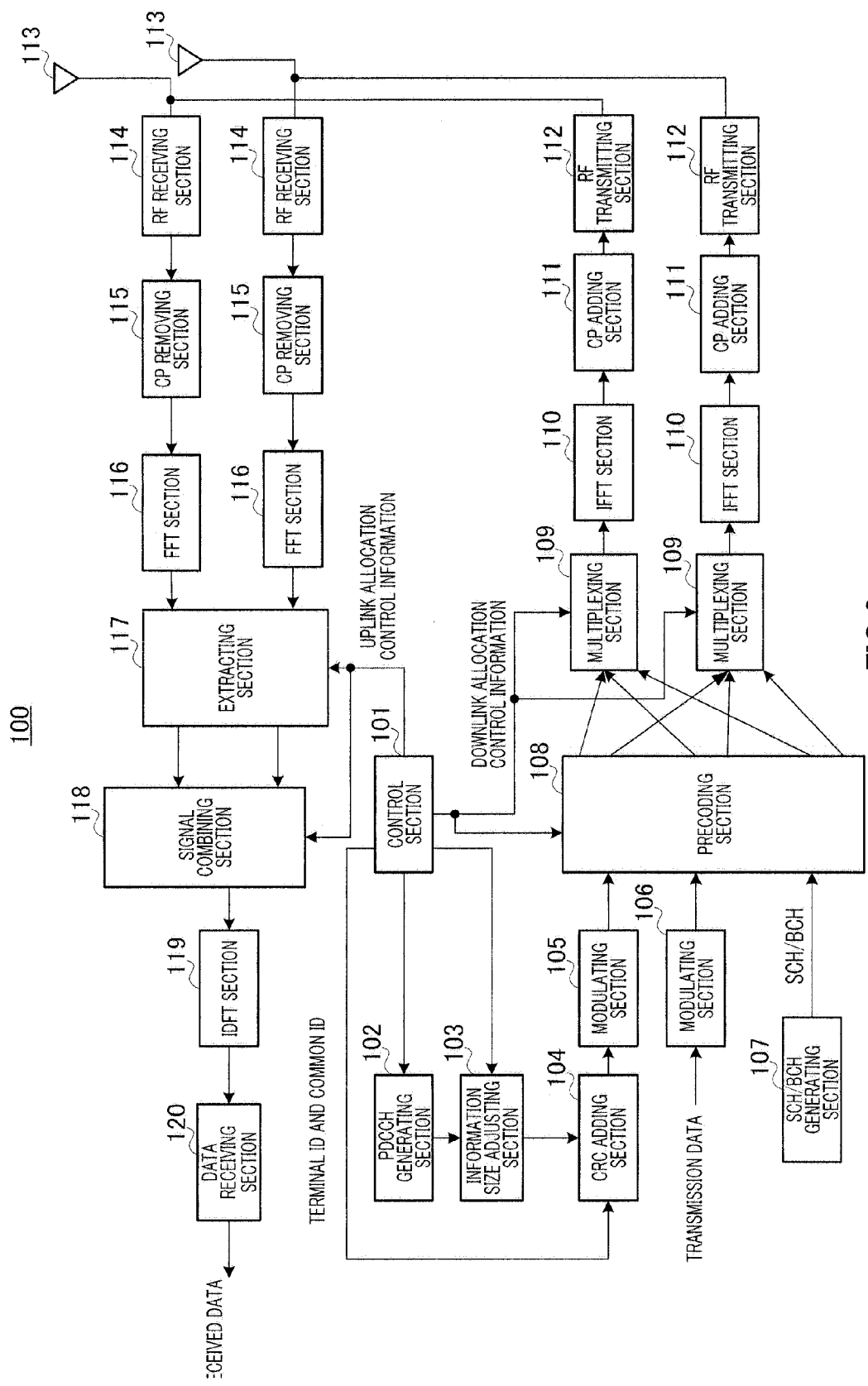
FIG. 3 is a block diagram showing a configuration of a base station according to the embodiment of the present invention.

FIG. 3 is a block diagram showing a configuration of base station 100 according to an embodiment of the present invention. In FIG. 3, base station 100 includes control section 101, PDCCH generating section 102, information size adjusting section 103, CRC (Cyclic Redundancy Check) adding section 104, modulating sections 105 and 106, SCH/BCH generating section 107, precoding section 108, multiplexing section 109, IFFT section 110, CP adding section 111, RF transmission section 112, antenna 113, RF reception section 114, CP removing section 115, FFT section 116, extracting section 117, signal combining section 118, IDFT section 119, and data reception section 120.

Control section 101 generates control information (including uplink assignment control information and downlink assignment control information).

With information size adjusting section 103, control section 101 includes a function as an information size control means to adjust the information size of downlink assignment control information and uplink assignment control information included in a PDCCH signal. To information size adjusting section 103, control section 101 outputs information according to the communication scheme applied between control section 101 and terminal 200 of a communication party which will be described later. The presumed communication schemes here are the four patterns shown in FIG. 1, namely communication without directivity control based on a command from a base station, directional communication based on a command from a base station, communication by discontinuous allocation without directivity control based on a command from a base station, communication by discontinuous allocation being directional communication on spatial multiplexing based on a command from a base station. In communication without directivity control based on a command from a base station Format 1A and Format 0 are a pair. In directional communication based on a command from a base station, Format 1B and Format 0A are a pair. In communication by discontinuous allocation without directivity control based on a command from a base station, Format 1 and Format 0B are a pair. In communication of discontinuous allocation information, which is directional communication by spatial multiplexing based on a command from a base station, Format 2 and Format 0C are a pair.

Specifically, for the pair of Format 1A and Format 0 and the pair of Format 1 and Format 0B, control section 101 outputs information size comparing information showing the difference in size between the information size of downlink assignment control information determined from the downlink frequency bandwidth and the information size of uplink assignment control information determined from the corresponding uplink frequency bandwidth, to information size adjusting section 103.

For the pair of Format 1B and Format 1A and the pair of Format 2 and Format 0C, control section 101 outputs information size comparing information showing the difference in size between the information size of downlink assignment control information determined from the downlink frequency bandwidth and from the number of antennas of base station 100, and the information size of uplink assignment control information determined from the corresponding uplink frequency bandwidth and the number of antennas of terminal 200, to information size adjusting section 103.

Also, control section 101 generates padding control information based on the number of transmitting antennas of base station 100 and the number of transmitting antennas of terminal 200, and outputs the padding control information to information size adjusting section 103. Specifically, if the number of transmitting antennas of terminal 200 to which base station 100 transmits a control signal is one, control section 101 generates padding control information not to perform padding for Format 1B and Format 2, and if the number of transmitting antennas of base station 100 is one, control section 101 generates padding control information not to perform padding for Format 0A and Format 0C.

PDCCH generating section 102 receives control information generated in control section 101, and generates a PDCCH signal to be sent in each downlink frequency band, based on the control information.

Information size adjusting section 103 receives the control information, information size comparing information, and padding control information generated in control section 101. Based on control information, information size comparing information, and padding control information, information size adjusting section 103 adjusts the information size of uplink assignment control information and downlink assignment control information included in a PDCCH signal received from PDCCH generating section 102.

Specifically, based on padding control information, information size adjusting section 103 determines whether or not a PDCCH signal subject to information size adjustment requires padding.

If information size adjusting section 103 determines, based on padding control information, that information size needs to be coordinated between uplink assignment control information and downlink assignment control information, for the pair of Format 1A and Format 0 and the pair of Format 1 and Format 0B, information size adjusting section 103 uses the larger one of the information size of downlink assignment control information determined from the downlink frequency bandwidth and the information size of uplink assignment control information determined from the corresponding uplink frequency bandwidth as a size adjustment reference, and, based on this size adjustment reference, information size adjusting section 103 adjusts the information size of assignment control information.

If information size adjusting section 103 determines, based on padding control information, that information size between uplink assignment control information and downlink assignment control information needs to be coordinated, for the pair of Format 1B and Format 0A and the pair of Format 2 and Format 0C, information size adjusting section 103 uses the larger one of the information size of downlink assignment control information determined from the downlink frequency bandwidth and the number of antennas of a base station and the information size of uplink assignment control information determined from the corresponding uplink frequency bandwidth and the number of antennas of a terminal as a size adjustment reference, and, based on this size adjustment reference, information size adjusting section 103 adjusts the information size of assignment control information.

On the other hand, if information size adjusting section 103 determines, based on padding control information, that information size between uplink assignment control information and downlink assignment control information does not need to be coordinated, for the pair of Format 0A and Format 1B and the pair of Format 2 and Format 0C, for downlink assignment control information (that is, Format 1B and Format 2), information size adjusting section 103 uses the information size of downlink assignment control information determined from the downlink frequency bandwidth and the number of antennas of base station 100 as is, and for uplink assignment control information (that is, Format 0A and Format 0C), information size adjusting section 103 uses the information size of uplink assignment control information determined from the uplink frequency bandwidth and the number of antennas of a terminal as is. That is, an information size adjustment is not performed. However, as for the pair of Format 1A and Format 0 and the pair of Format 1 and Format 0B, an information size adjustment is performed as mentioned above.

To be more specific, information size adjusting section 103 includes a padding section (not shown) to adjust the information size of control information by adding zero information to control information. This padding section adds zero information to the smaller information sizes until the information size of downlink assignment control information and the information size of uplink assignment control information have equal information size. To which one of downlink assignment control information and uplink assignment control information zero information is added is determined based on information size comparing information.

CRC adding section 104 adds a CRC bit to a size adjusted PDCCH signal in information size adjusting section 103, and then masks the CRC bit with a terminal ID. Then, CRC adding section 104 outputs the masked PDCCH signal to modulating section 105.

Modulating section 105 modulates a PDCCH signal input from CRC adding section 104, and outputs the modulated PDCCH signal to precoding section 108.

Modulating section 106 modulates input transmission data (downlink data), and outputs the modulated transmission data signal to precoding section 108.

SCH/BCH generating section 107 generates a SCH and BCH, and outputs the generated SCH and BCH to precoding section 108.

Precoding section 108 applies a weight for a transmission signal for each terminal, on a per antenna 113 basis, based on precoding information, that is, based on transmission weight control information, provided from control section 101. This precoding process is performed for the PDCCH signal input from modulating section 105, the data signal (that, is a PDSCH signal) input from modulating section 106, and the SCH and BCH input from SCH/BCH generating section 107. The weight (Precoding Matrix Indicator: PMI) used for this precoding for downlink assignment control information and SCH/BCH is determined in advance between the terminal side and the base station side. Thus, terminal 200 receives downlink control information according to the weight. The PMI for downlink channel data is reported to each terminal 200, individually, by downlink assignment control information.

Multiplexing section 109 multiplexes the PDCCH signal after precoding processing, a data signal, and a SCH and BCH. Based on the terminal ID input from control section 101 and downlink assignment control information associated with the terminal ID, multiplexing section 109 maps a data signal (a PDSCH signal) for terminal 200 associated with the terminal ID to a downlink component band.

Also, multiplexing section 109 maps the PDCCH signal after precoding processing, to the resource region allocated for a PDCCH.

IFFT section 110 converts a multiplex signal into a time waveform, and CP adding section 111 acquires an OFDM signal by adding a CP to this time waveform.

RF transmission section 112 performs a transmission radio process (such as up-conversion and a digital-to-analog (D/A) conversion) to an OFDM signal input from CP adding section 111, and transmits the result through antenna 113. Then, an OFDM signal including assignment control information is sent.

RF reception section 114 performs a receiving radio process (such as a down-conversion and an analog-to-digital (A/D) conversion) to a received radio signal which is received in a receiving band through antenna 113, and outputs the received signal to CP removing section 115.

CP removing section 115 removes the CP from the received signal, and FFT section 116 converts the received signal, from which the CP has been removed, into a frequency domain signal.

Based on uplink assignment control information input from control section 101, extracting section 117 extracts uplink data from a frequency domain signal input from FFT section 116. Antenna 113, RF reception section 114, CP removing section 115, and FFT section 116 are set double in here. Thus, extracting section 117 performs an extract processing for antenna 113 and the same number of streams.

Based on precoding information (that is, transmission weight control information used in terminal 200) used by uplink data indicated from control section 101, signal combining section 118 combines a signal output from extracting section 117 by using a technique such as MRC or MMSE. Therefore, the SINR of a received signal improves.

IDFT (Inverse Discrete Fourier Transform) section 119 converts the extracted signal into a time domain signal and outputs the time domain signal to data reception section 120.

Data reception section 120 decodes the time domain signal input from IDFT section 119. And data reception section 120 outputs decoded uplink data as received data.

Figure 4:
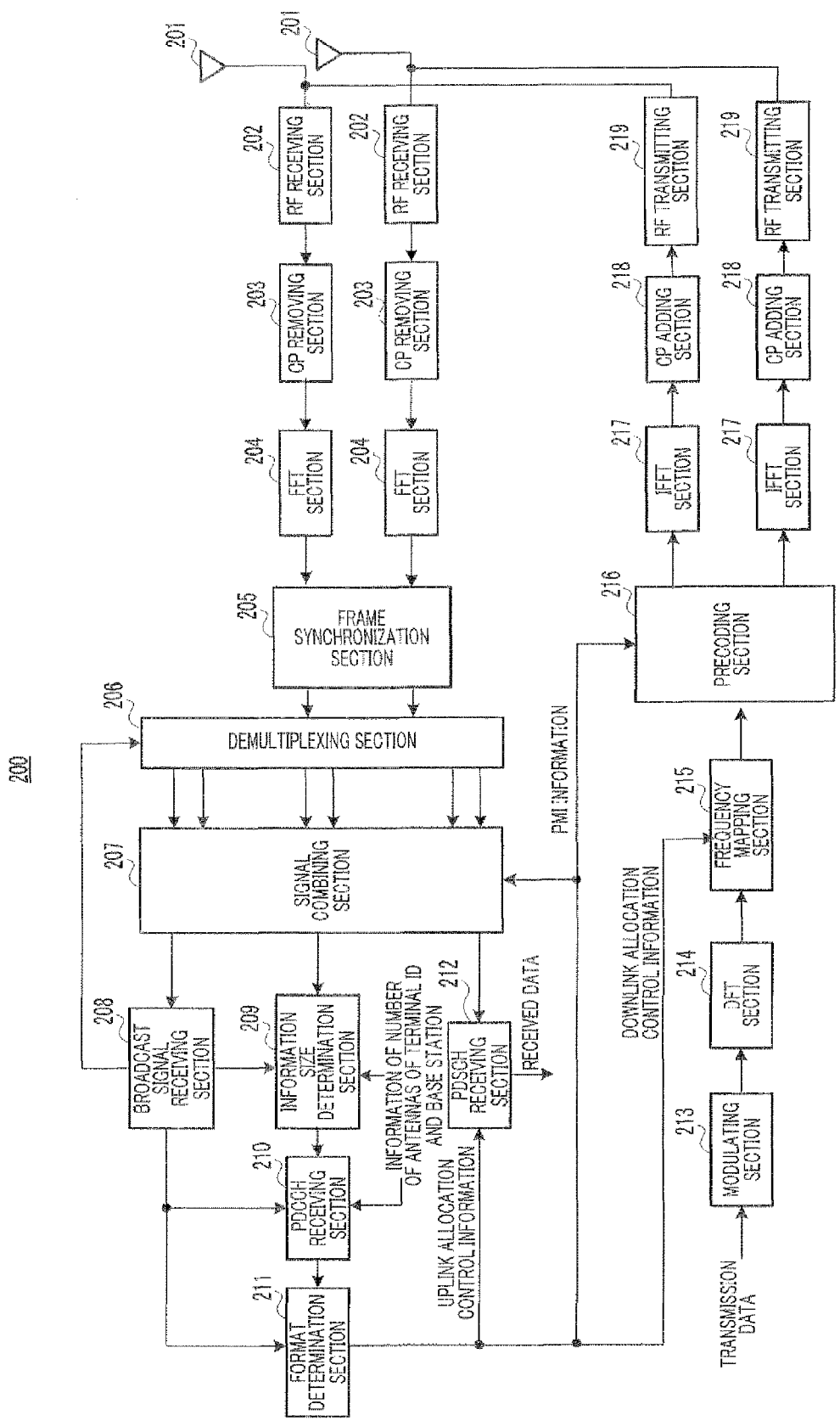
FIG. 4 is a block diagram showing a configuration of a terminal according to the embodiment of the present invention.

FIG. 4 is a block diagram showing the configuration of terminal 200 according to an embodiment of the present invention. In FIG. 4, terminal 200 includes antenna 201, RF reception section 202, CP removing section 203, FFT section 204, frame synchronization section 205, demultiplexing section 206, signal combining section 207, broadcast signal reception section 208, information size determination section 209, PDCCH reception section 210, format determination section 211, PDSCH reception section 212, modulating section 213, DFT section 214, frequency mapping section 215, precoding section 216, IFFT section 217, CP adding section 218, and RF transmission section 219.

RF reception section 202 performs a receiving radio process (such as a down-conversion and an analog-to-digital (A/D) conversion) to a received radio signal (in this case, an OFDM signal) which is received in a receiving band through antenna 201, and outputs the received signal to CP (Cyclic Prefix) removing section 203.

CP removing section 203 removes the CP from the received signal, and FFT (Fast Fourier Transform) section 204 converts the received signal, from which the CP has been removed, into a frequency domain signal. This frequency domain signal is output to frame synchronization section 205.

While searching for a SCH included in a signal input from FFT section 204, frame synchronization section 205 establishes synchronization (frame synchronization) with base station 100. Also, frame synchronization section 205 acquires a cell ID associated with a sequence used for a SCH (a SCH sequence). That is, the same process as a normal cell search is performed in frame synchronization section 205. Also, to demultiplexing section 206, frame synchronization section 205 outputs frame synchronization timing information showing a frame synchronization timing, and the signal input from FFT section 204.

Based on frame synchronization timing information input from frame synchronization section 205, demultiplexing section 206 demultiplexes the signal input from frame synchronization section 205 into a broadcast signal (that is, a BCH), a control signal (that is, a PDCCH signal), and a data signal (that is, a PDSCH signal): Demultiplexing section 206 receives information about a downlink component band from broadcast signal reception section 208, and extracts a PDCCH signal on a per downlink component band basis based on this information.

Based on PMI information of PDSCH output from format determination section 211, a broadcast signal determined in advance by the terminal side and the base station side, and PMI information of PDCCH, signal combining section 207 combines the broadcast signal, the PDCCH, and the PDSCH, demultiplexed from a received component in each antenna 201 of terminal 200.

Broadcast signal reception section 208 reads the contents of a BCH input from signal combining section 207, and acquires information about a configuration of a downlink band and uplink band of base station 100. Broadcast signal reception section 208 acquires, for example, the bandwidth of uplink component band, the bandwidth of downlink component band, and information about their associations. Broadcast signal reception section 208 outputs the acquired BCH information to information size determination section 209, PDCCH reception section 210, and format determination section 211.

Information size determination section 209 receives a PDCCH signal from signal combining section 207, and determines the basic information size to perform blind detection on this PDCCH signal. For the pair of Format 1A and Format 0 and the pair of Format 1 and Format 0B, this basic information size is determined from the downlink frequency bandwidth received from broadcast signal reception section 208 and the corresponding uplink frequency bandwidth, and, for the pair of Format 1B and Format 0A and the pair of Format 2 and Format 0C, this basic information size is determined from the number of transmitting antennas of base station 100, the downlink frequency bandwidth received from broadcast signal reception section 208, the corresponding uplink frequency bandwidth, and the number of transmitting antennas of terminal 200.

Specifically, if both base station 100 and terminal 200 have multiple antennas, for the pair of Format 1A and Format 0 and the pair of Format 1 and Format 0B, information size adjusting section 209 uses the larger one of the information size of downlink assignment control information determined from the downlink frequency bandwidth and the information size of uplink assignment control information determined from the corresponding uplink frequency bandwidth as a size adjustment reference, and, based on this size adjustment reference, information size adjusting section 209 adjusts the information size of assignment control information. For the pair of Format 1B and Format 0A and the pair of Format 2 and Format 0C, information size adjusting section 209 uses the larger one of the information size of downlink assignment control information determined from the downlink frequency bandwidth and the number of antennas of base station 100 and the information size of uplink assignment control information determined from the uplink frequency bandwidth and the number of antennas of a terminal as a size adjustment reference, and, based on this size adjustment reference, information size adjusting section 209 adjusts the information size of assignment control information.

On the other hand, if the number of antennas of terminal 200 is one, information size adjusting section 209 uses the information size of downlink assignment control information (that is, Format 1B and Format 2) determined from the downlink frequency bandwidth and the number of antennas of base station 100 as is, for the pair of Format 0A and Format 1B and the pair of Format 2 and Format 0C.

Furthermore, if the number of antennas of base station 100 is one, information size adjusting section 209 uses the information size of uplink assignment control information (that is, Format 0A and Format 0C) determined from the uplink frequency bandwidth and the number of antennas of terminal 200 as is, for the pair of Format 0A and Format 1B and the pair of Format 2 and Format 0C. That is, an information size adjustment is not performed. However, for the pair of Format 1A and Format 0 and the pair of Format 1 and Format 0B, an information size adjustment as mentioned above is performed.

Information size determination section 209 outputs information about the decided basic information size and the PDCCH signal associated with this information to PDCCH reception section 210.

PDCCH reception section 210 performs blind detection for a PDCCH signal based on the basic information size decided in information size determination section 209.

That is, PDCCH reception section 210 specifies the CRC bit part by using the basic information size (payload size) decided in information size determination section 209. Next, after demasking the specified CRC bit part by the terminal ID of terminal 200, if a CRC calculation result is "OK" with respect to the whole PDCCH signal, PDCCH reception section 210 decides that the PDCCH signal is a PDCCH signal transmitted for terminal 200. Thus, the PDCCH signal decided to be received by terminal 200 is output to format determination section 211.

Based on type information of assignment control information included in a PDCCH signal received from PDCCH reception section 210, format determination section 211 decides which one is uplink assignment control information or downlink assignment control information between the format pair having the same size. If format determination section 211 identifies uplink assignment control information, format determination section 211 outputs uplink assignment control information included in the PDCCH signal to frequency mapping section 215. Also, if format determination section 211 identifies downlink assignment control information, format determination section 211 outputs downlink assignment control information included in the PDCCH signal to PDSCH reception section 212.

Based on downlink assignment control information input from format determination section 211, PDSCH reception section 212 extracts received data from the PDSCH signal input from signal combining section 207.

Modulating section 213 modulates transmission data and outputs a resulting modulated signal to DFT (Discrete Fourier Transform) section 214.

DFT section 214 converts a modulated signal input from modulating section 213 into a frequency domain, and outputs a resulting plurality of frequency components to frequency mapping section 215.

In accordance with uplink assignment control information input from format determination section 211, frequency mapping section 213 maps a plurality of frequency components input from DFT section 214, on a PUSCH placed in an uplink component band.

Precoding section 216 determines a transmission weight, that is a precoding vector, to set upon transmission from PMI information included in uplink assignment control information, and maps the transmission data on the stream associated with each antenna 201.

IFFT section 217 converts each stream being frequency components into a time domain waveform, and CP adding section 218 adds a CP to the time domain waveform.

RF transmission section 219 performs a transmission radio process (such as an up-conversion and a digital-to-analog (D/A) conversion) to a signal with a CP, and transmits the result through antenna 201.

An operation of base station 100 and terminal 200 having the above mentioned configuration will be described. As mentioned above, four communication schemes are prepared between base station 100 and terminal 200. That is, there are four patterns: communication scheme 1, communication without directivity control based on a command from a base station; communication scheme 2, directional communication based on a command from a base station; communication scheme 3, communication by discontinuous allocation without directivity control based on a command from a base station; and communication scheme 4, communication by discontinuous allocation being directional communication on spatial multiplexing based on a command from a base station. As for information size control in base station 100 and terminal 200, basically, communication without directivity control based on a command from a base station and communication by discontinuous allocation without directivity control based on a command from a base station form one group based on the same rule, and directional communication based on a command from a base station and communication by discontinuous allocation being directional communication on spatial multiplexing based on a command from a base station form the other group. Thus, to avoid complicated explanation, selecting one from each group, communication scheme 1, which is communication without directivity control based on a command from a base station, and communication scheme 2, which is directional communication based on a command from a base station, will be described.

If base station 100 or terminal 200 has only one transmitting antenna port, in communication scheme 1, one antenna port is used for transmitting. Also, if base station 100 or terminal 200 has multiple transmitting antenna ports, in communication scheme 1, diversity transmission, determined in advance between base station 100 and terminal 200, is performed. Thus, an antenna selecting diversity transmission which performs communication by selecting one of multiple transmitting antenna ports, STBC, SFBC (see Non-patent Literature 1, 2 and 3), so-called "open loop transmission diversity control," are performed.

In base station 100, based on the number M (M is a natural number) of transmitting antennas which are available for the terminal, and the number N (N is a natural number) of transmitting antennas which are available for terminal 200, control section 101 determines whether the information sizes of downlink assignment control information and uplink assignment control information included in a PDCCH signal need to be adjusted or not.

As shown in FIG. 5, if M and N are both greater than one (in this case, M=N=2), in both communication scheme 1 and communication scheme 2, control section 101 determines that the above information size adjustment is necessary.

On the other hand, if one of M and N is greater than one and the other is one, control section 101 determines that the above mentioned information size adjustment is necessary in communication scheme 1, and the above mentioned information size adjustment is unnecessary in communication scheme 2.

Information size adjusting section 103 adjusts the information sizes of downlink assignment control information and uplink assignment control information included in a PDCCH signal, based on a determination result of the necessity of information size adjustment in control section 101.

Thus, in communication scheme 1, the above mentioned information size adjustment is necessary regardless of the number of antennas. In communication scheme 2, if M and N are both greater than one, the above mentioned information size adjustment is necessary, or, if one of M and N is greater than one and the other is one, the above mentioned information size adjustment is unnecessary.

Next, information size adjusting section 103 adjusts the information sizes of downlink assignment control information and uplink assignment control information included in a PDCCH signal, based on a determination result of the necessity of information size adjustment in control section 101.

Specifically, in communication scheme 1, information size adjusting section 103 uses the larger one of the information size of downlink assignment control information (that is, Format 1A) determined from the downlink frequency bandwidth and the information size of uplink assignment control information (that is, Format 0) determined from the corresponding uplink frequency bandwidth as a size adjustment reference, and, based on this size adjustment reference, information size adjusting section 103 adjusts the information size of assignment control information.

Even in communication scheme 2, if M and N are both greater than one (in this case, M=N=2), information size adjusting section 103 uses the larger one of the information size of downlink assignment control information (that is, Format 1B) determined from the downlink frequency bandwidth and M, and the information size of uplink assignment control information (that is, Format 0A) determined from the corresponding uplink frequency bandwidth and N, as a size adjustment reference, and, based on this size adjustment reference, information size adjusting section 103 adjusts the information size of assignment control information.

On the other hand, in communication scheme 2, if M is greater than one and N is one, for downlink assignment control information (that is, Format 1B), information size adjusting section 103 uses the information size of downlink assignment control information determined from the downlink frequency bandwidth and M as is. In this case, uplink assignment control information is not substantially transmitted. This is because when the number N of antennas in terminal 200 is one, it is impossible to execute, on an uplink channel, communication scheme 2 that is possible only if the transmitting side has multiple antennas, and it is not even necessary to transmit uplink assignment control information (that is, Format 0A).

Also, in communication scheme 2, if N is greater than one and M is one, for uplink assignment control information (that is, Format 0A), information size adjusting section 103 uses the information size of uplink assignment control information determined from the uplink bandwidth and N as is. In this case, downlink assignment control information is not substantially transmitted. This is because when the number M of antennas in base station 100 is one, it is impossible to execute, on a downlink channel, communication scheme 2 that is possible only if the transmitting side has multiple antennas, and it is not even necessary to transmit downlink assignment control information (that is, Format 1B).

As mentioned above, in base station 100, the information size of downlink assignment control information included in a downlink channel signal, and uplink assignment control information are adjusted, based on the communication scheme, the number M of transmitting antenna ports of base station 100, the number N of transmitting antenna ports of terminal 200, the bandwidth of a downlink band, and the bandwidth of an uplink band. Thus, a PDCCH signal which is adjusted an information size is transmitted to terminal 200.

In terminal 200, information size determination section 209 decides the basic information size when performing blind detection on a received PDCCH signal. This basic information size is determined based on the communication scheme which is applied between base station 100 and terminal 200, the number M of transmitting antenna ports of base station 100, the number N of transmitting antenna ports of terminal 200, the bandwidth of a downlink band, and the bandwidth of an uplink band. These pieces of information are shared between base station 100 and terminal 200 by communication if a higher layer.

Specifically, in communication scheme 1, information size adjusting section 209 determines the basic information size based on the larger one of the information size of downlink assignment control information (that is, Format 1A) determined from the downlink frequency bandwidth and the information size of uplink assignment control information (that is, Format 0) determined from the corresponding uplink bandwidth.

Also, even in communication scheme 2, if M and N are both greater than one (in this case, M=N=2), information size adjusting section 209 determines the basic information size based on the larger one of the information size of downlink assignment control information (that is, Format 1B) determined from the downlink frequency bandwidth and M and the information size of uplink assignment control information (that is, Format 0A) determined from the corresponding uplink frequency bandwidth and N.

On the other hand, in communication scheme 2, if M is greater than one and N is one, information size adjusting section 209 determines the basic information size based on the information size of downlink assignment control information determined from the downlink frequency bandwidth and M.

Also, in communication scheme 2, if N is greater than one and M is one, information size adjusting section 209 determines the basic information size based on the information size of uplink assignment control information determined from the uplink frequency bandwidth and N.

As mentioned above, according to the present embodiment, in terminal 100, control section 101 and information size adjusting section 103 control the information size of downlink assignment control information and uplink assignment control information included in a PDCCH signal, based on the communication scheme which is applied between base station 100 and terminal 200, the number M of transmitting antennas of base station 100, the number N of transmitting antennas of terminal 200, the bandwidth of a downlink band, and the bandwidth of an uplink band.

Specifically, if the selected communication scheme is possible only if the transmitting side has multiple antennas (for example, the above mentioned communication scheme 2 and communication scheme 4) and if one of M and N is greater than one and the other is one, control section 101 determines that the above mentioned information size adjustment is unnecessary.

By this means, the frequency of performing size adjustment process in base station 100 can be reduced.

On the other hand, if M and N are both greater than one, control section 101 determines that the above mentioned information size adjustment is necessary regardless of the type of communication scheme. In this case, information size adjusting section 103 uses the larger one of the information size of downlink assignment control information determined from the downlink frequency bandwidth and M and the information size of uplink assignment control information determined from the corresponding uplink frequency bandwidth and N as a size adjustment reference, and, based on this size adjustment reference, information size adjusting section 209 adjusts the information size of assignment control information.

By this means, the sameness of the information size of uplink assignment control information and the information size of downlink assignment control information can be kept, it is possible to prevent the number of times of blind detection from increasing in terminal 200 on the receiving side.

According to the above explanation, the information size of each format pair is determined in relation to the number of transmitting antennas of base station 100 and the number of transmitting antennas of terminal 200. However, the present invention is not limited to this, and for example it is possible that base station 100 reports directly information about the method of determining the information size, that is, the number of effective transmitting antennas on the base station side and the terminal side, and terminal 200 determines the final basic information size based on this report. In this case, as shown in FIG. 6, terminal 200 sets the basic information size, which is calculated based on the method of determining the information size mentioned in the above embodiment, as a default until base station 100 gives a command, and terminal 200 determines the final basic information size according to the command from base station 100. Thus, for example, if M is 2 and N is 2, the upper mode in FIG. 6 becomes a default, and is switched to the middle mode in which the number of effective transmitting antennas of a terminal is one or the lower mode in which the number of effective transmitting antennas of a base station is one by reporting from base station 100 (that is, signaling of base station 100). Here, it is assumed that both base station 100 and terminal 200 have multiple transmitting antennas. Also, the fact that the number of effective transmitting antennas is one here means that one antenna is conditioned to be able to transmit. As this kind of case, for example, a case is possible where only one transmitting antenna is conditioned to be available temporarily because the remaining battery power is low.

According to the above explanation, a base station determines whether or not information size adjustment of assignment control information is necessary, based on the number of antenna ports hold by a base station and a terminal, or the number of effective antenna ports. However, the present invention is not limited to this, and, for example, base station 100 may report directly to a terminal the method of determining information size. Thus, for each communication scheme 1, communication scheme 2, communication scheme 3, and communication scheme 4, a base station may report to each terminal 200, on an individual basis, whether or not an information size adjustment performed between uplink assignment control information and downlink assignment control information is necessary. In this case, terminal 200 sets the basic information size, which is calculated based on the method of determining the information size mentioned in the above embodiment, as a default until base station 100 gives a command, and determines the final basic information size according to the command from base station 100.

Also, in FIG. 5 and FIG. 6, a case is described as an example where an "antenna port" and a physical antenna are associated on a one-by-one basis, but even if "the number of antennas" in FIG. 5 and FIG. 6 is redefined by "the number of antenna ports," the same effects can be gained in the same embodiment.

Although in the above explanation base station 100 transmits a downlink signal by using a unified downlink frequency band and terminal 200 transmits a unified uplink frequency band, the present invention is not limited to this. Thus, even if so-called carrier aggregation, where multiple bands defined in LTE are communicated together, the present invention is applicable to each pair of uplink band and downlink band.

Also, in the above explanation, if the number of transmitting antennas of a base station is one, the type information of resource allocation, which is transmitted in the size of the pair of Format 1B and Format 0A and the pair of Format 2 and Format 0C, always indicates an uplink allocation signal. That is, the parts associated with the type information of this resource allocation information can be used like a parity bit, or can be used to transmit other kinds of information, or may be it is possible to increase the power per bit by reducing the bits which represent type information, so that can improve power per bit to transport effective information of a PDCCH. The same applies when the number of transmitting antennas of a terminal is one.

Embodiment mentioned above explains an example when the present invention is performed by hardware, but the present invention can be implemented with software.

Furthermore, each function block employed in the description of the aforementioned embodiment may typically be implemented as an LSI constituted by an integrated circuit. These may be individual chips or partially or totally contained on a single chip. "LSI" is adopted here but this may also be referred to as "IC," "system. LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-332127, filed on Dec. 26, 2008 including the specification, drawings and abstract, is incorporated herein by reference in their entirety.

INDUSTRIAL APPLICABILITY

A radio base station, radio terminal, and channel signal forming method of the present invention is useful to prevent the quality of downlink assignment control information or uplink assignment control information from degrading, by preventing the number of times of blind detection in a radio terminal, which is on the receiving side of a downlink control channel signal, from increasing, and by reducing the frequency of performing size adjustment process to downlink assignment control information or uplink assignment control information, when communication is performed using a downlink band and an uplink band between a radio terminal that has N transmission antenna ports (N is a natural number) and a radio base station that has M transmission antenna ports (M is a natural number).

The invention claimed is:

1. A communication apparatus communicating with a terminal, the communication apparatus comprising:
    a generating section, including a processor, configured to generate first control information including downlink resource assignment information, and to generate second control information including uplink resource assignment information; and
    a size control section configured to perform a size adjustment for control information, wherein, when at least one of (i) a number of antenna port(s) of the communication apparatus and (ii) a number of antenna port(s) of the terminal is one, said size control section is configured to perform the size adjustment such that:
        a size of the second control information with a format including no precoding matrix indicator (PMI) is equal to a size of the first control information with a format including no PMI; and
        a size of the second control information with a format including the PMI and a size of the first control information are not made the same.

2. A method for generating control information used to control communication between a terminal and a communication apparatus, the method comprising:
    generating first control information including downlink resource assignment information, and generating second control information including uplink resource assignment information; and
    performing a size adjustment for control information,
        wherein when at least one of (i) a number of antenna port(s) of the communication apparatus and (ii) a number of antenna port(s) of the terminal is one, the size adjustment is performed such that:
            a size of the second control information with a format including no precoding matrix indicator (PMI) is equal to a size of the first control information with a format including no PMI; and
            a size of the second control information with a format including the PMI and a size of the first control information are not made the same.

3. The communication apparatus according to claim 1, wherein when a transmission is performed using one antenna port or when a diversity transmission is performed, the format including no PMI is used.

4. The communication apparatus according to claim 1, wherein the format including no PMI for the second control information is a Format 0, and the format including no PMI for the first control information is a Format 1A.

5. The communication apparatus according to claim 1, wherein said size control section is configured to perform the size adjustment by appending zeroes to a smaller sized one of the first control information with the format including no PMI and the second control information with the format including no PMI until the size of the second control information with the format including no PMI is equal to the size of the first control information with the format including no PMI.

6. The communication apparatus according to claim 1, wherein when a transmission with directivity control is performed, the format including PMI is used for the second control information.

7. The communication apparatus according to claim 1, wherein said size control section is configured to set the size of the second control information with the format including PMI to a size determined from an uplink bandwidth.

8. The communication apparatus according to claim 1, wherein said size control section is configured to set the size of the first control information with the format including PMI to a size determined from a downlink bandwidth.

9. The method according to claim 2, wherein when a transmission is performed using one antenna port or when a diversity transmission is performed, the format including no PMI is used.

10. The method according to claim 2, wherein the format including no PMI for the second control information is a Format 0, and the format including no PMI for the first control information is a Format 1A.

11. The method according to claim 2, wherein the size adjustment is performed by appending zeroes to a smaller sized one of the first control information with the format including no PMI and the second control information with the format including no PMI until the size of the second control information with the format including no PMI is equal to the size of the first control information with the format including no PMI.

12. The method according to claim 2, wherein when a transmission with directivity control is performed, the format including PMI is used.

13. The method according to claim 2, wherein the size of the second control information with the format including PMI is set to a size determined from an uplink bandwidth.

14. The method according to claim 2, wherein the size of the first control information with the format including PMI is set to a size determined from a downlink bandwidth.

* * * * *